United States Patent [19]

Wacha

[11] Patent Number: 4,670,742
[45] Date of Patent: Jun. 2, 1987

[54] MONITORING SYSTEM FOR THE TRIGGER CIRCUIT OF AN ELECTRICAL POWER SWITCH

[75] Inventor: Gerhard Wacha, Widen, Switzerland

[73] Assignee: BBC Brown, Boveri & Company, Limited, Baden, Switzerland

[21] Appl. No.: 730,838

[22] Filed: May 6, 1985

[30] Foreign Application Priority Data

May 4, 1984 [CH] Switzerland ............... 2177/84

[51] Int. Cl.$^4$ ............................................. G08B 21/00
[52] U.S. Cl. ................................... 340/653; 331/64; 340/644; 340/664
[58] Field of Search ........... 340/653, 650, 659, 658, 340/644, 530, 632, 649, 664; 331/64, 65

[56] References Cited

U.S. PATENT DOCUMENTS

| | | | |
|---|---|---|---|
| 2,907,012 | 9/1959 | Pitman et al. | 340/530 |
| 3,418,914 | 12/1968 | Finkin | 340/632 X |
| 3,641,552 | 2/1972 | Friberg | 331/64 X |

FOREIGN PATENT DOCUMENTS

3037273  5/1982  Fed. Rep. of Germany .
1048340  1/1959  German Democratic Rep. .

OTHER PUBLICATIONS

J. Jamieson, "LR Oscillator Indicates Inductance Directly," Electronics International, vol. 53, No. 11, p. 170 (May 8, 1980).

Primary Examiner—James L. Rowland
Assistant Examiner—Daniel Myer
Attorney, Agent, or Firm—Burns, Doane, Swecker & Mathis

[57] ABSTRACT

Monitoring of trigger circuits of power switches of electrical power supply devices which can experience faults due to breakage of conductors, oxidation of contacts, loosened terminal contacts, short circuits in trigger coils, etc. In order to improve fault monitoring, oscillator oscillations are applied to the trigger circuit of a power switch and are monitored. A fault- or alarm signal is generated in response to a detuning of an oscillator when the detuning persists for a predetermined time. The inductance of the circuit-breaking coil of the power switch serves as a frequency-determining element of the oscillator. A lag element with a delay of 500 ms is inserted after the oscillator. If the oscillator stays detuned for more than 500 ms, a Schmitt trigger is triggered by the lag element, whereby an alarm relay is actuated which switches on an alarm device via an alarm relay contact.

7 Claims, 2 Drawing Figures

MONITORING SYSTEM FOR THE TRIGGER CIRCUIT OF AN ELECTRICAL POWER SWITCH

BACKGROUND OF THE INVENTION

This invention relates to methods and apparatus for monitoring the trigger circuit of an electrical power switch.

A prior art monitoring system for the trigger circuit of an electrical power switch is disclosed and described in the leaflet of the Swiss firm Brown, Boveri & Cie., CH-ES 64-22.1 D/E/F, Classification No. 071401, "Ausloesekreisueberwachungsrelais Typ VIR 1". The trigger circuit monitoring relay disclosed therein comprises a monitoring element with two windings, one of which is connected, through a limiting resistance, to the connecting terminal of a protective relay in the connecting wire to a power switch, and the other of which windings is connected, through a limiting resistance, to a main contact and an auxiliary contact of the power switch. An alarm relay is switchable on and off via switch contacts of the trigger circuit monitoring relay, which switch contacts are disposed in a circuit with an alarm device which device is supplied with a separate alarm voltage. In this prior art monitoring system, the trigger circuit monitoring relay does not respond to a short circuit in the circuit-breaking coil of the power switch, or to an abrupt increase in the resistance of the circuit-breaking coil (said increase due to, e.g. corrosion).

Another prior art device is disclosed in German OS No. 30 37 273, wherein an electronic trigger circuit monitoring system is disclosed with an optically coupled diode between three measuring signal input stages and a registration stage for instant visual and/or audio registration of a fault. this monitoring system operates by the current-monitoring principle, whereby the voltage drop is detected at two series-connected power diodes in the circuit of the power switch. The necessary measuring current (about 20 mA) for monitoring the function in the trigger circuit is produced by wiring the circuit-breaking trigger contacts, as well as the auxiliary contacts of the power switch, with glazed wirewound resistors. The registration stage responds when the measurement current in one of the measurement signal input stages falls below about 12 mA. In order to protect against excess voltage in the case of failure of a high-ohm power diode, in each input stage a zener diode is provided in parallel with the two power diodes. This zener diode is sized for a temporary current of 10 A. A disadvantage of this arrangement is the use of the power diodes, which are unreliable, and also the use of the auxiliary contacts of the power switch, and the parallel hookup of the glazed wirewound resistors.

OBJECTS AND SUMMARY OF THE INVENTION

An object of the invention is to improve the fault monitoring of the trigger circuit of a power switch.

This object is accomplished in accordance with this invention by the use of an oscillator in the detection means of the trigger circuit wherein the inductive and/or ohmic resistance of the trigger circuit is a frequency-determining resistance of the oscillator, and detuning of the oscillator triggers an alarm.

An advantage of the invention consists of the fact that fault detection can be reliably improved for power switch trigger circuits without adding to costs. The trigger circuit of the power switch may be monitored not only for failure of the trigger voltage, interruption of the connecting conductors, and a faulty switching procedure, but also for short-circuiting of the trigger coil.

The monitoring system and the method of monitoring the trigger circuit of the invention are both suitable for use with power switches which are connected to the trigger voltage via protective circuit-breaker relay contacts or via switching thyristors both of which can be triggered without any difficulty; this is not readily possible when using a trigger circuit monitoring relay with a holding current as in the abovedescribed prior art device. The monitoring system of the invention can also be used to monitor control circuits wherein power switch trigger circuits and control relays are connected in parallel, e.g. for actuating reserve protection devices for switches. In addition, it is possible to monitor control circuits, wherein instead of the power switch circuit-breaker coil being monitored, a master trip relay for multiple contacts and signals is monitored.

A further advantage of the invention is the absence of a need for a trigger circuit monitoring relay with mechanical contacts.

According to a preferred embodiment of the invention, the alarm voltage employed for powering the monitoring system is the trigger voltage coming from the power switch. The current drawn by the monitoring system is constant, so that it is possible to adjust to different trigger voltages by means of series resistances. In the event of failure of the trigger voltage, an alarm is generated without delay.

Limiting resistances in the connecting conductors to the coils of the monitoring element of the trigger circuit monitoring relay are dispensed with.

BRIEF DESCRIPTION OF THE DRAWINGS

A preferred embodiment of the invention is illustrated in the accompanying drawings, in which.

DETAILED DESCRIPTION

Figure 1:
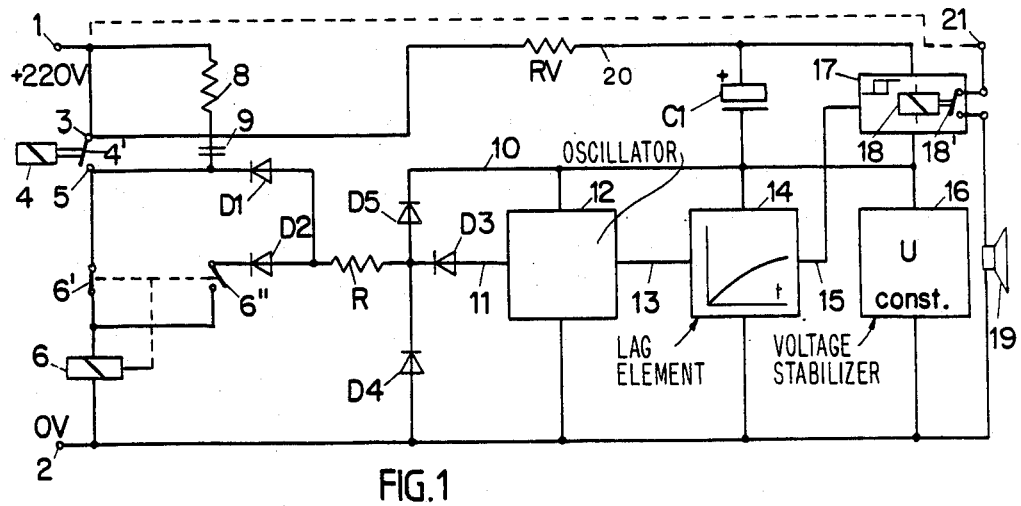
FIG. 1 is a main circuit diagram of the monitoring system of the invention.

A positive voltage terminal 1 (FIG. 1) is used to apply a trigger voltage of 220 V, and a negative voltage terminal 2 is connected to ground. Terminal 1 is electrically connected to a terminal 3 of a circuit-breaker relay contact 4' of a circuit-breaker relay (4, 4') having a circuit-breaker relay measuring element 4. Terminal 5, the second terminal of the circuit-breaker relay contact 4', is connected to the negative terminal 2 via ca control contact 6' of a closed power switch (6, 6', 6"), and via the tripping coil 6 of said switch. The auxiliary contact 6" of the power switch is open when the control contact 6' of the power switch is closed, and vice versa.

The second terminal of the auxiliary contact 6" of the power switch is connected to the cathode of an avalanche diode D2 with a high breakdown voltage. The anode of this diode D2 is connected to the terminal 5 via a similarly poled avalanche diode D1; and to the cathodes of diodes D3 and D4, and the anode of diode D5, respectively, via a resistance R. The anode of diode D3 is connected to a high impedance input 11 of an oscillator 12. The diode D3 serves to block the polarity-sensitive stage of the input transistor of the oscillator 12. The anode of diode D4 is connected to the negative voltage terminal 2, and the cathode of diode D5 is connected to a conductor 10 which is at a positive voltage. Conductor 10 serves to supply the oscillator 12, a lag element 14, an element 16 for maintaining constant voltage, and a bistable flip flop element, i.e. a Schmitt trigger, with a positive supply voltage. The Schmitt trigger 17 is connected to the terminal 3 of the circuit-breaker relay contact 4' via a feed voltage conductor 20 and a series resistance RV; the Schmitt trigger thus comprises part of the resistance in series with the voltage stabilizer 16.

A damping resistance 8 with a damping capacitor 9 is connected in series between the positive voltage terminal 1 and the terminal 5 of the circuit-breaker relay contact 4' for the purpose of damping voltage peaks when the circuit-breaker relay contact 4' is opened. This damping circuit has no deleterious effect on the monitoring function of the oscillator, with regard to bypassing of the monitored part of the circuit.

Figure 2:
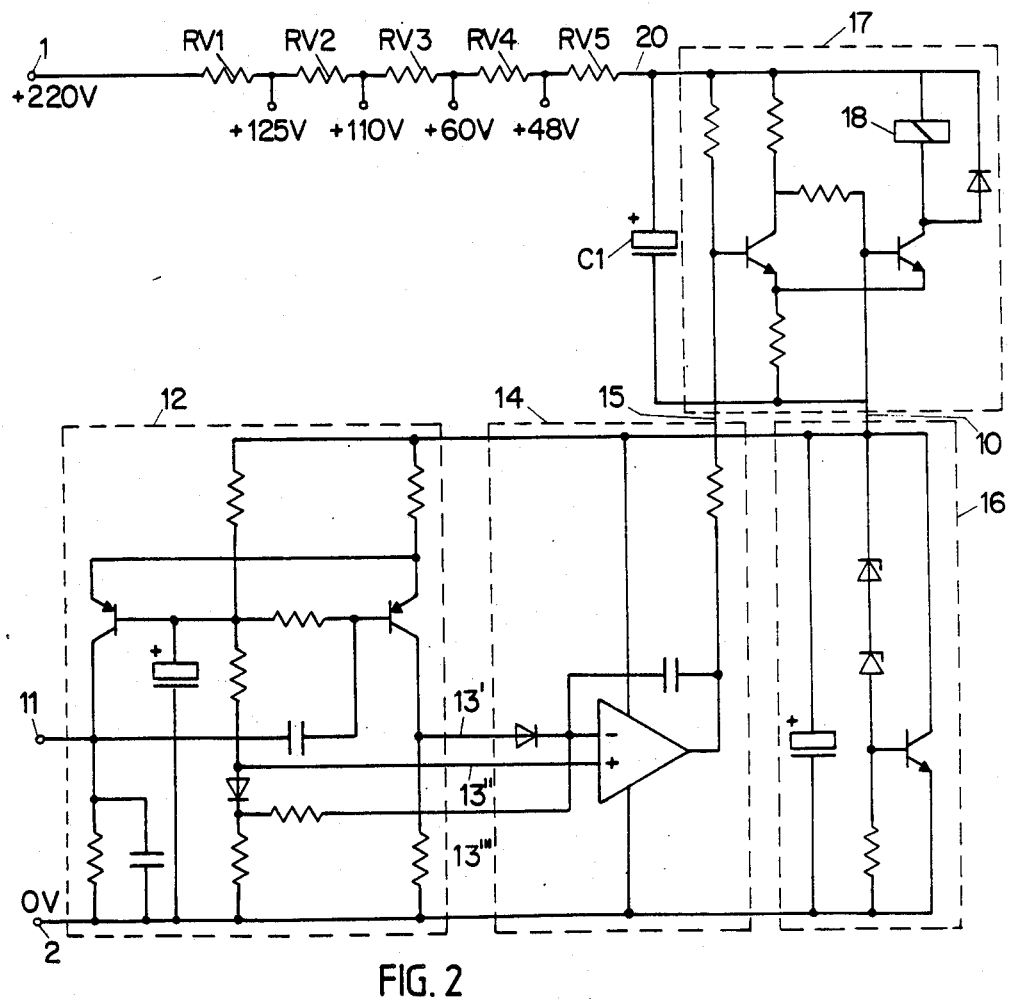
FIG. 2 is a circuit diagram more fully illustrating the circuitry represented in FIG. 1 by blocks.

The output of the oscillator 12 is connected to the signal input of the lag element 14 and signal inputs of a a timing circuit in the form of a differential amplifier; this connection is via the signal conductors 13'. 13", and 13''' (see FIG. 2). The lag element is set up for a delay of 500 ms. It is connected on its output side to the control input of an emitter-coupled Schmitt trigger 17, via a signal conductor 15.

Instead of the customary collector resistor on the output transistor, the Schmitt trigger 17 has a coil 18 which is the relay coil of the alarm relay (18, 18'). A relay contact 18' of the alarm relay is disposed in the power supply conductor of an alarm device 19, which device is supplied with an alarm voltage via a positive voltage terminal 21; alternatively it may be powered directly from the trigger voltage.

Instead of a single series resistance, a plurality of series resistances RV1-RV5 may be employed (FIG. 2), with a plurality of voltage terminals to provide lower trigger voltages of 125, 110, 60 or 48 V.

To damp excess oscillations, a polarized electrolytic capacitor C1 is connected parallel to the Schmitt trigger 17.

The voltage regulator 16 has a smoothing capacitor and, parallel to said capacitor, two zener diodes in series with a resistance and a base-controlled power transistor; in this way the supply voltage of the oscillator 12 and the lag element 14 are held constant at around 12 V.

The oscillator 12 alternatingly energizes the power switch circuit-breaker coil 6, via the diode D3, the resistance R, the diode D1, the terminal 5, and the closed power switch control contact 6'—or, when the power switch auxiliary contact 6" is closed and contact 6' is open, then via contact 6", diode D2, resistance R and diode D3. If the oscillation fails, a delayed alarm signal is triggered via the lag element 14. The differential amplifier of the lag element 14 produces at its output a tigger voltage which in the normal operating state of the power switch remains under 200 mV, and in the distributed or faulty state of the power switch a voltage up to beween 500 mV and around 12 V, which then triggers the Schmitt trigger, whereby the alarm relay (18, 18') responds and actuates the alarm device 19 via the relay contact 18'. The alarm may be registered acoustically or optically in customary fashion or in any fashion desired.

In place of a single alarm relay contact 18', one may employ a plurality of simultaneously actuated contacts, each of which governs a different funtion. The circuits for the oscillator 12, the lag element 14, the voltage regulator 16, and the Schmitt trigger 17 shown in FIG. 2 may be replaced by other known circuits for such devices or elements. It is important that the trigger circuit to be monitored is provided with a driven oscillation and that detuning of the oscillator with subsequent failure of the oscillation is monitored; and that in response to such failure of the oscillation, an alarm is triggered following a preset delay.

Although a preferred embodiment of the invention has been described and illustrated in the application, any and all modification and equivalent arrangements which are within the scope of the following claims should be considered to be part of the present invention.

What is claimed is:

1. In a monitoring system for a trigger circuit of an electrical power switch of the type having a detector for monitoring the passage of current through the trigger circuit which generates an alarm signal in response to a fault condition, and having an alarm device which registers the fault condition in response to an alarm signal, the improvement comprising:
   a detector including an oscillator having an input operatively connected to said trigger circuit and an output, and whose frequency is determined by the resistance of said trigger circuit;
   a delay means with predetermined time constants connected to the output of said oscillator and having an output; and
   an alarm device operatively connected to the output of said delay means for being switched on and off in response to an output signal of the delay means; said trigger circuit including a circuit breaker relay having a circuit breaker contact input terminal and said oscillator being powered through a current flowing through said input terminal.

2. A monitoring system according to claim 1, and further comprising a bistable trigger element having an input connected to the output of said delay means for receiving the output signal of said delay means and an output for providing an output signal to actuate said alarm device, whereby said alarm device is switched on or off depending on the triggering state of the bistable trigger element.

3. A monitoring system according to claim 2, wherein the bistable trigger element is an emitter-coupled Schmitt trigger including an output transistor having a collector resistance that is a relay coil of an alarm relay and the alarm relay has at least one contact for switching the alarm device on and off.

4. In a monitoring system for a trigger circuit of an electrical power switch of the type having a detector for monitoring the passage of the current through the trigger circuit which generates an alarm signal in response to a fault condition, and having an alarm device which registers the fault condition in response to an alarm signal, the improvement comprising:
   a detector including an oscillator having an input operatively connected to said trigger circuit and an output, and whose frequency is determined by the resistance of said trigger circuit;
   a delay means with predetermined time constants connected to the output of said oscillator and having an output;
   an alarm device operatively connected to the output of said delay means for being switched on and off in response to an output signal of the delay means; and a bistable trigger element having an input connected to the output of said delay means for receiving the output signal of said delay means and an output for providing an output signal to actuate said alarm device, whereby said alarm device is switched on or off depending on the triggering state of the bistable trigger element;

said bistable trigger element being an emitter-coupled Schmitt trigger including an output transistor having a collector resistance that is a relay coil of an alarm relay and the alarm relay having at least one contact for switching the alarm device on and off;

said trigger circuit including a circuit breaker relay having a circuit breaker contact input terminal connected in series with the power switch, said Schmitt trigger being operatively connected to said input terminal and said oscillator being powered by a current flowing from said input terminal through said Schmitt trigger.

5. In a monitoring system for a trigger circuit of an electrical power switch of the type having a detector for monitoring the passage of current through the trigger circuit which generates an alarm signal in response to a fault condition, and having an alarm device which registers the fault condition in response to an alarm signal, the improvement comprising:

a detector including an oscillator having an input operatively connected to said trigger circuit and an output, and whose frequency is determined by the resistance of said trigger circuit;

a delay means with predetermined time constants connected to the output of said oscillator and having an output;

an alarm device operatively connected to the output of said delay means for being switched on and off in response to an output signal of the delay means; and protective means in said operative connection of said trigger circuit to said oscillator for preventing excess voltage from reaching the input of said oscillator, said protective means including:

first and second avalanche diodes, a resistance and a third diode;

said first and second diodes each being in a series connection to said resistance and said third diode connected on its cathode side to said resistance an on its anode side to the input of said oscillator;

a fourth diode connected on its cathode side to the cathode side of said third diode and connected on its anode side to a negative voltage terminal of said oscillator; and a fifth diode connected on its anode side to the cathode side of said third diode and connected on its cathode side to a voltage conductor for supplying current to said oscillator.

6. A monitoring system according to claim 5, wherein the power switch is a relay; and one of the first and second diodes is operatively connected to a contact of said circuit-breaker relay and to a switch contact of said power switch relay which is in turn connected to a switching coil of said power switch relay.

7. A monitoring system according to claim 6, and further comprising a damping circuit including a series connected damping capacitor and damping resistance, said damping circuit connected between said contact of said circuit-breaker and a positive voltage terminal of the trigger circuit.

* * * * *